United States Patent
Mikuriya et al.

(10) Patent No.: US 8,255,120 B2
(45) Date of Patent: Aug. 28, 2012

(54) STEERING APPARATUS, AUTOMOTIVE VEHICLE WITH THE SAME, AND STEERING CONTROL METHOD

(75) Inventors: Yutaka Mikuriya, Yamato (JP); Tadashi Tamasho, Fujisawa (JP); Masahiro Miura, Yokohama (JP); Tetsurou Kamada, Yokosuka (JP); Toru Okubo, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 983 days.

(21) Appl. No.: 12/054,732

(22) Filed: Mar. 25, 2008

(65) Prior Publication Data

US 2008/0249686 A1   Oct. 9, 2008

(30) Foreign Application Priority Data

Apr. 6, 2007   (JP) .................. 2007-100384

(51) Int. Cl.
 *B62D 9/00* (2006.01)
 *B62D 7/14* (2006.01)
(52) U.S. Cl. .......................................... 701/42
(58) Field of Classification Search ...... 701/42
 See application file for complete search history.

(56) References Cited

U.S. PATENT DOCUMENTS

| | | | |
|---|---|---|---|
| 2,824,749 A * | 2/1958 | Yasuda | 180/409 |
| 3,183,991 A * | 5/1965 | Gamaunt | 180/24 |
| 4,041,678 A * | 8/1977 | Chaney et al. | 56/10.7 |
| 5,143,400 A * | 9/1992 | Miller et al. | 280/5.522 |
| 6,354,394 B1 * | 3/2002 | Bauer-Nilsen | 180/409 |
| 6,625,529 B2 * | 9/2003 | Obata et al. | 701/41 |
| 7,464,785 B2 * | 12/2008 | Spark | 180/236 |
| 7,529,600 B2 * | 5/2009 | Mori et al. | 701/1 |
| 2002/0198644 A1 * | 12/2002 | Obata et al. | 701/41 |
| 2003/0070862 A1 * | 4/2003 | Tartara | 180/411 |
| 2005/0189730 A1 * | 9/2005 | White | 280/6.154 |
| 2005/0217906 A1 * | 10/2005 | Spark | 180/22 |
| 2006/0048976 A1 * | 3/2006 | Deguchi et al. | 180/6.5 |
| 2006/0261214 A1 | 11/2006 | Wallner et al. | |
| 2009/0210113 A1 * | 8/2009 | Auguet | 701/42 |

FOREIGN PATENT DOCUMENTS

| | | |
|---|---|---|
| JP | 2006-123597 A | 5/2006 |
| JP | 2007-1365 A | 1/2007 |
| JP | 2007-76399 A | 3/2007 |

* cited by examiner

*Primary Examiner* — Shelley Chen
(74) *Attorney, Agent, or Firm* — Foley & Lardner LLP (57) ABSTRACT

An automotive vehicle with a steering apparatus includes a steering wheel, front and rear steerable road wheels, and a steering mechanism for steering the front and rear steerable road wheels. The steering apparatus measures a steering wheel angle of the steering wheel; sets a desired position of a center of rotation about which the vehicle is to rotate for changing a heading angle of the vehicle with respect to a path of the vehicle; sets a desired turning behavior of the vehicle in accordance with the measured steering wheel angle and the desired position of the center of rotation; sets the desired front and rear road wheel steer angles in accordance with the desired turning behavior; and controls the steering mechanism in accordance with the desired front and rear road wheel steer angles.

12 Claims, 10 Drawing Sheets

STEERING APPARATUS, AUTOMOTIVE VEHICLE WITH THE SAME, AND STEERING CONTROL METHOD

BACKGROUND OF THE INVENTION

The present invention relates generally to steering apparatuses for vehicles, automotive vehicles with the same, and steering control methods for vehicles, and particularly to steering apparatuses for vehicles, automotive vehicles with the same, and steering control methods for vehicles, wherein the vehicles include a steering input device, and front and rear steering output devices.

Japanese Patent Application Publication No. 2006-123597 discloses a steering apparatus for a vehicle including a steering wheel, and front and rear steerable road wheels. The steering apparatus is configured to adjust a heading angle of the vehicle with respect to a path of the vehicle during turning by setting a desired position of a center of turning (or revolution, not rotation) of the vehicle, and controlling a steer angle of the rear road wheel in accordance with the desired position of the center of turning of the vehicle.

SUMMARY OF THE INVENTION

In general, required changes in road wheel steer angles for producing a change in the heading angle of a vehicle, increase with decreasing vehicle speed. In such a viewpoint, according to Japanese Patent Application Publication No. 2006-123597, when it is desired to produce a change in the heading angle of the vehicle while the vehicle is traveling at low speeds, the steering apparatus may cause rapid changes in the steer angle of the rear road wheel, because the steering apparatus is configured to control the steer angle of the rear road wheel only in accordance with the desired position of the center of turning of the vehicle. This may make the dynamic behavior of the vehicle unstable.

In view of the foregoing, it is desirable to provide a steering apparatus for a vehicle, an automotive vehicle with the same, and a steering control method for a vehicle, wherein the vehicles include a steering input device, and front and rear steering output devices, and wherein the heading angle of the vehicles can be changed without adversely affecting the dynamic behavior of the vehicles.

According to one aspect of the present invention, a steering apparatus for a vehicle including a steering input device, front and rear steering output devices, and a steering mechanism for steering the front and rear steering output devices, comprises: a measurement section arranged to measure a steering input of the steering input device; and a control section configured to: set a desired position of a center of rotation about which the vehicle is to rotate for changing a heading angle of the vehicle with respect to a path of the vehicle; set desired front and rear steering outputs in accordance with the measured steering input and the desired position of the center of rotation; and control the steering mechanism in accordance with the desired front and rear steering outputs.

According to another aspect of the present invention, a steering apparatus for a vehicle including a steering input device, front and rear steering output devices, and a steering mechanism for steering the front and rear steering output devices, comprises: means for measuring a steering input of the steering input device; means for setting a desired position of a center of rotation about which the vehicle is to rotate for changing a heading angle of the vehicle with respect to a path of the vehicle; means for setting desired front and rear steering outputs in accordance with the measured steering input and the desired position of the center of rotation; and means for controlling the steering mechanism in accordance with the desired front and rear steering outputs.

According to a further aspect of the present invention, a steering apparatus for a vehicle including a steering input device, and front and rear steering output devices, comprises: a sensor for measuring a steering input of the steering input device; a steering mechanism for steering the front and rear steering output devices in accordance with desired front and rear steering outputs; and a controller connected for signal communication to the sensor and the steering mechanism, and configured to: set a desired path of the vehicle in accordance with the measured steering input; set a desired sideslip angle of the vehicle in accordance with the measured steering input; set a corrected desired sideslip angle of the vehicle in accordance with the desired sideslip angle; set a desired yaw rate of the vehicle in accordance with the desired path and a rate of change of the corrected desired sideslip angle; and set the desired front and rear steering outputs in accordance with the desired sideslip angle and the desired yaw rate.

According to a still further aspect of the present invention, an automotive vehicle comprises: a steering input device; front and rear steering output devices; a steering mechanism for steering the front and rear steering output devices; a measurement section arranged to measure a steering input of the steering input device; and a control section configured to: set a desired position of a center of rotation about which the vehicle is to rotate for changing a heading angle of the vehicle with respect to a path of the vehicle; set desired front and rear steering outputs in accordance with the measured steering input and the desired position of the center of rotation; and control the steering mechanism in accordance with the desired front and rear steering outputs.

According to another aspect of the present invention, a steering control method for a vehicle including a steering input device, front and rear steering output devices, and a steering mechanism for steering the front and rear steering output devices, comprises: measuring a steering input of the steering input device; setting a desired position of a center of rotation about which the vehicle is to rotate for changing a heading angle of the vehicle with respect to a path of the vehicle; setting desired front and rear steering outputs in accordance with the measured steering input and the desired position of the center of rotation; and controlling the steering mechanism in accordance with the desired front and rear steering outputs.

BRIEF DESCRIPTION OF THE DRAWINGS

FIGS. 4A and 4B are views showing two different situations in each of which an automotive vehicle is turning right, where FIG. 4A shows a case of an automotive vehicle according to a comparative example, and FIG. 4B shows a case of the automotive vehicle according to the first embodiment.

DETAILED DESCRIPTION OF THE INVENTION

First, the following defines terms used in the present specification. "Turning" is defined as a motion of a vehicle as a particle in a plane with respect to the ground while the vehicle is traveling along a curved path. "Center of turning" is defined as a point about which a vehicle as a particle is turning or revolving in a plane. "Rotation" is defined as a motion of a vehicle with respect to a coordinate system moving along with a motion of the vehicle as a particle with respect to the ground. "Center of rotation" is defined as a point about which a vehicle is rotating in a plane.

Figure 1:
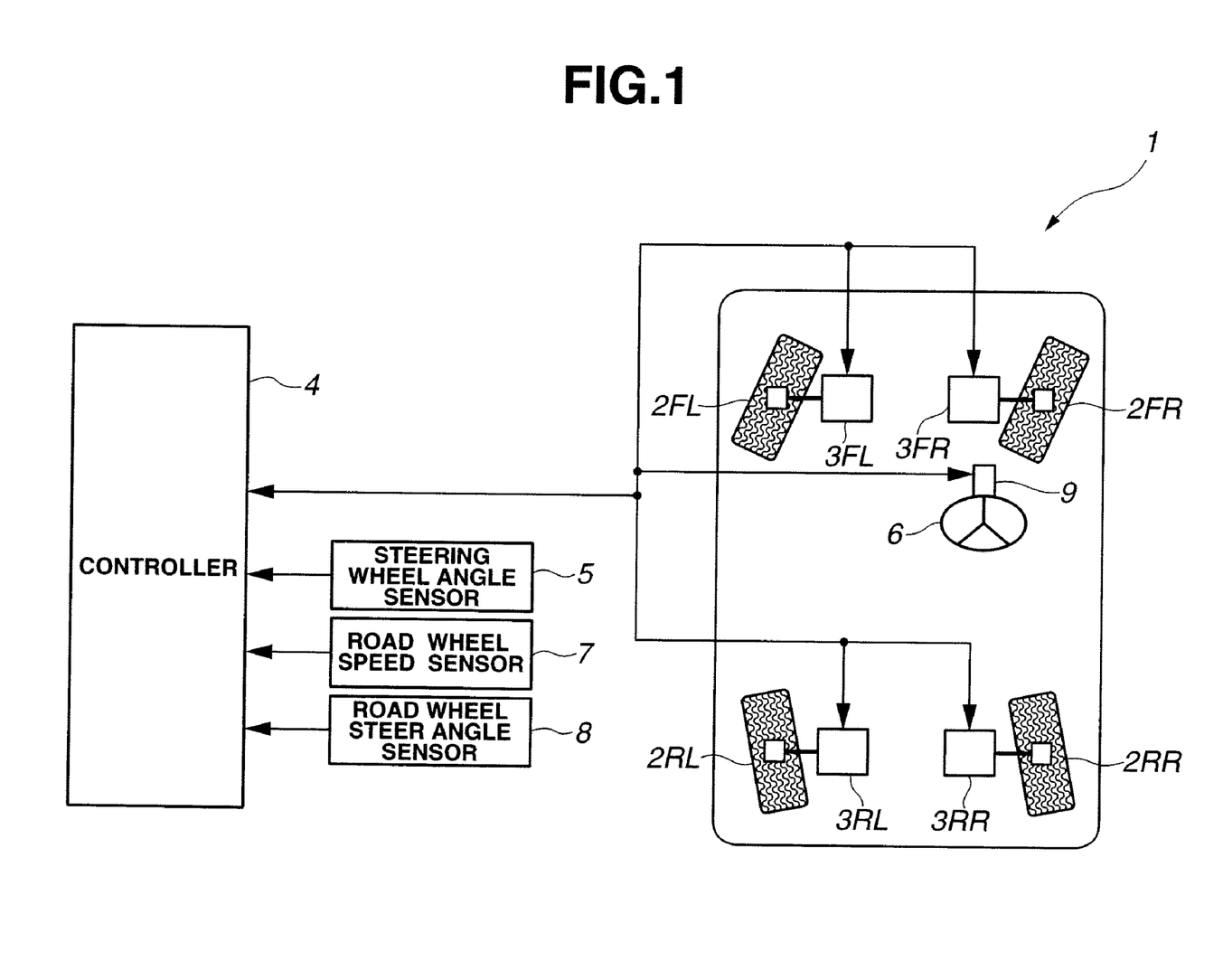
FIG. 1 is a schematic diagram showing system configuration of an automotive vehicle with a steering apparatus according to a first embodiment of the present invention.

FIG. 1 schematically shows an automotive vehicle with a steering apparatus according to a first embodiment of the present invention. The automotive vehicle includes a steering input device, front and rear steering output devices, and a steering mechanism for steering the front and rear steering output devices mechanically independently of each other. Specifically, as shown in FIG. 1, an automotive vehicle 1 includes a steering wheel 6 as a steering input device, four road wheels 2FL, 2FR, 2RL and 2RR as front and rear steering output devices, four steering mechanisms 3FL, 3FR, 3RL and 3RR, and a controller 4 as a control section. Steering mechanisms 3FL, 3FR, 3RL and 3RR are mechanically separated from each other, and arranged to steer respective ones of road wheels 2FL, 2FR, 2RL and 2RR. The steer angles of road wheels 2FL, 2FR, 2RL and 2RR can be thus changed independently of each other. When steering wheel 6 is operated by a driver, then controller 4 controls steering mechanisms 3FL, 3FR, 3RL and 3RR in accordance with a steering input of steering wheel 6. Automotive vehicle 1 is thus provided with a steer-by-wire system. Each steering mechanism 3FL, 3FR, 3RL or 3RR includes an electric motor, a hypoid gear with an irreversible characteristic, and a rack-and-pinion mechanism, where rotation of the electric motor is transmitted through the hypoid gear to the rack-and-pinion mechanism so as to steer a respective one of road wheels 2FL, 2FR, 2RL and 2RR.

Figure 2:
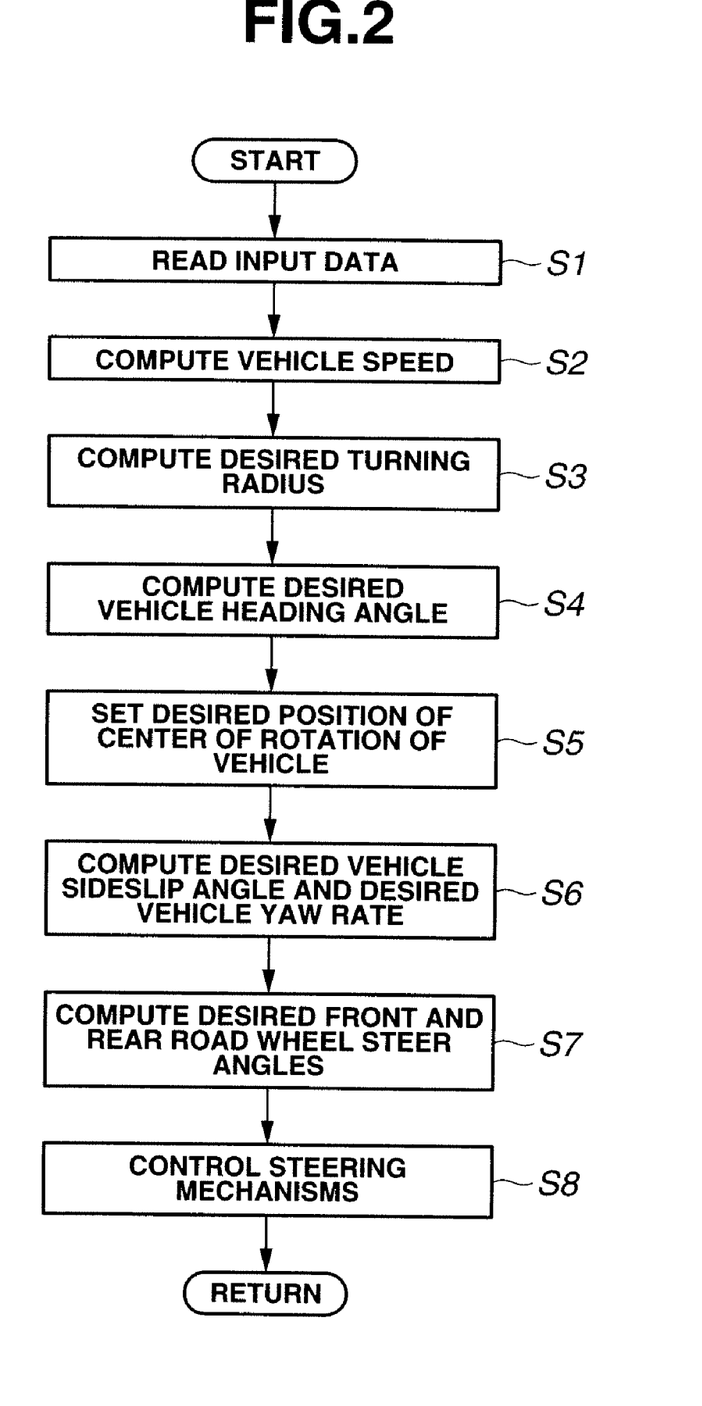
FIG. 2 is a flow chart showing a steering control method according to the first embodiment to be carried out by the steering apparatus of the automotive vehicle according to the first embodiment.

The steering apparatus includes a measurement section including a set of sensors for measuring an operating state of automotive vehicle 1. Controller 4 is configured to receive data signals outputted from the set of sensors, and to carry out a control process as shown in FIG. 2 and described below on the basis of the data signals. The set of sensors includes a steering wheel angle sensor 5, a road wheel speed sensor 7, and a road wheel steer angle sensor 8. Steering wheel angle sensor 5 is arranged to measure a steering wheel angle of steering wheel 6 as a steering input, and output a data signal indicative of the measured steering wheel angle to controller 4. Road wheel speed sensor 7 is arranged to measure wheel speeds of road wheels 2FL, 2FR, 2RL and 2RR, and output a data signal indicative of the measured wheel speeds to controller 4. Road wheel steer angle sensor 8 is arranged to measure road wheel steer angles of road wheels 2FL, 2FR, 2RL and 2RR, and outputs a data signal indicative of the measured road wheel steer angles to controller 4.

The steering apparatus includes a steering feedback motor 9. Steering feedback motor 9 is mechanically connected to steering wheel 6, and arranged to generate a steering feedback torque applied to steering wheel 6. While carrying out steer-by-wire control, controller 4 controls steering feedback motor 9 in such a manner that steering feedback motor 9 generates a suitable steering feedback torque in accordance with the steering input of steering wheel 6.

Figure 3:
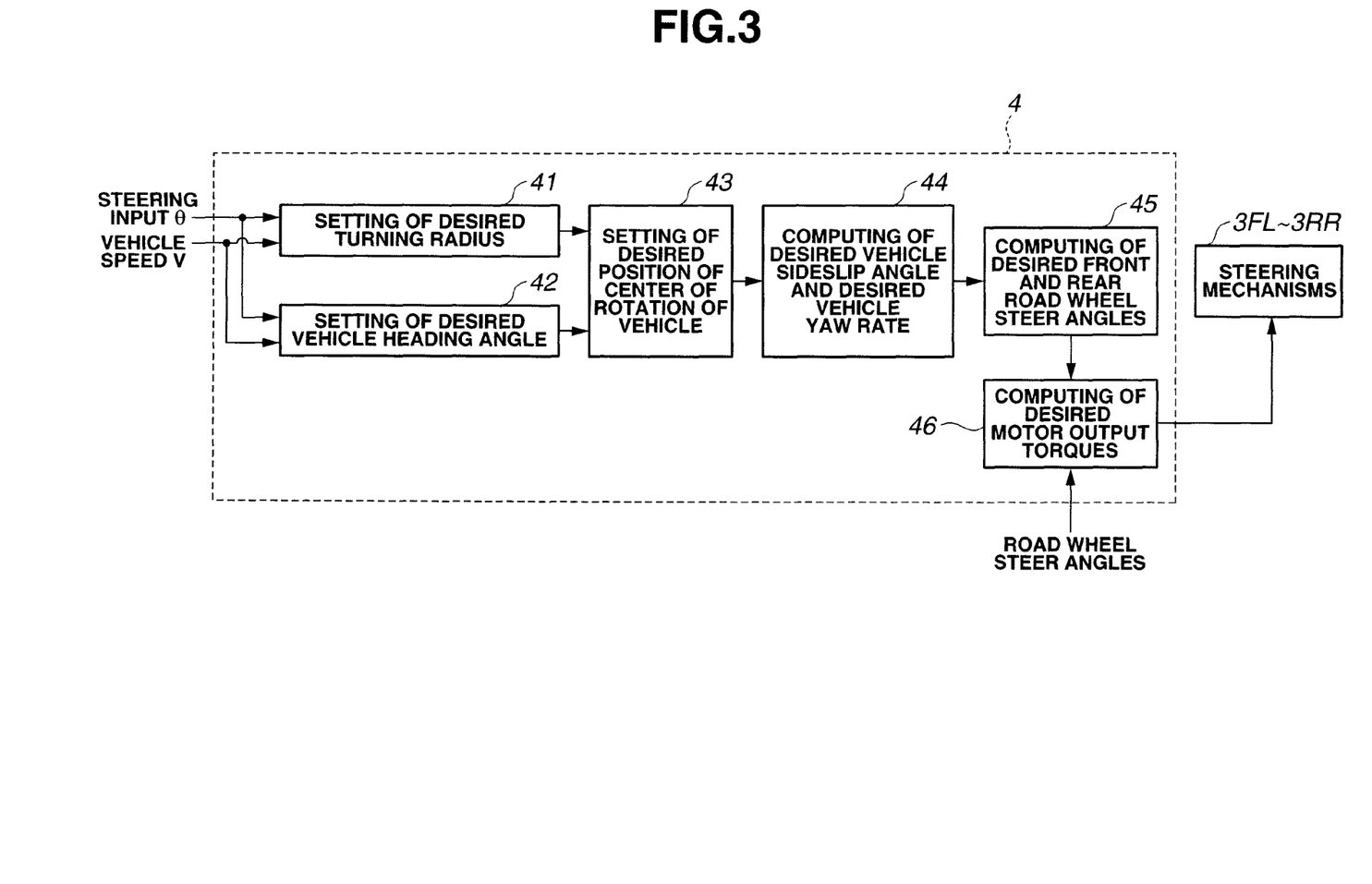
FIG. 3 is a block diagram showing detailed configuration of a controller of the steering apparatus according to the first embodiment.

The following describes how controller 4 carries out a steering control process with reference to the flow chart shown in FIG. 2. FIG. 3 shows detailed configuration of controller 4 for implementing the steering control process. When a request for entering this control process is issued during execution of a main program stored in controller 4, then controller 4 first proceeds to Step S1 shown in FIG. 2.

At Step S1, controller 4 reads data concerning the measured steering wheel angle θ, the measured wheel speeds, and the measured road wheel steer angles.

At Step S2, controller 4 measures or estimates or computes a current vehicle speed V of automotive vehicle 1 on the basis of the measured wheel speeds.

At Step S3, controller 4 sets or computes a desired turning radius R on the basis of the measured steering wheel angle θ, using equation (1):

$$1/R(s) = R_E \times \theta(s) \quad (1)$$

where s represents the Laplace operator, R(s) represents the Laplace transform of the desired turning radius R, θ(s) represents the Laplace transform of the measured steering wheel angle θ, and $R_E$ represents a gain related to steering wheel angle.

In equation (1), the gain $R_E$ may be set using equation (2):

$$R_E = 1/\{(1+AV^2) \times L \times n\} \quad (2)$$

where A represents a stability factor of automotive vehicle 1, V represents the measured vehicle speed, L represents the wheel base of automotive vehicle 1, and n represents an overall steering ratio.

The overall steering ratio n is defined as the rate of change of steering wheel angle at a given steering wheel trim position, with respect to change in average steer angle of steered wheels, assuming an infinitely stiff steering system with no roll of the vehicle. Equation (2) serves to simulate dynamic characteristics of a front-wheel steering vehicle.

Equation (1) may be replaced with equation (3):

$$1/R(s) = R_E \times \{1/(1+T \cdot s)\} \times \theta(s) \quad (3)$$

where T represents a time constant.

The term of $\{1/(1+T\cdot s)\}$ serves as a low-pass filter for reducing adverse effects of high frequency waves such as noises, thus improving transient responses.

At Step S4, controller 4 sets or computes a desired vehicle heading angle α on the basis of the desired turning radius R, using equation (4):

$$\alpha(s) = R_0/R(s) \quad (4)$$

where α(s) represents the Laplace transform of the desired vehicle heading angle α, R(s) represents the Laplace transform of the desired turning radius R, and $R_0$ represents a gain related to turning radius.

Figure 4A:
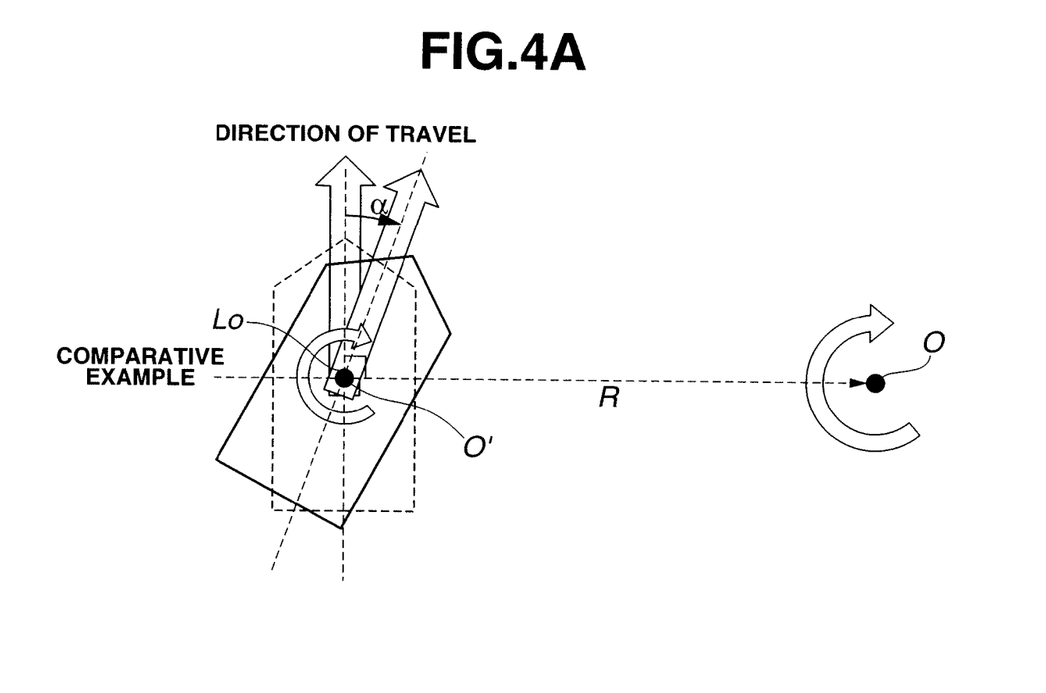
Figure 4B:
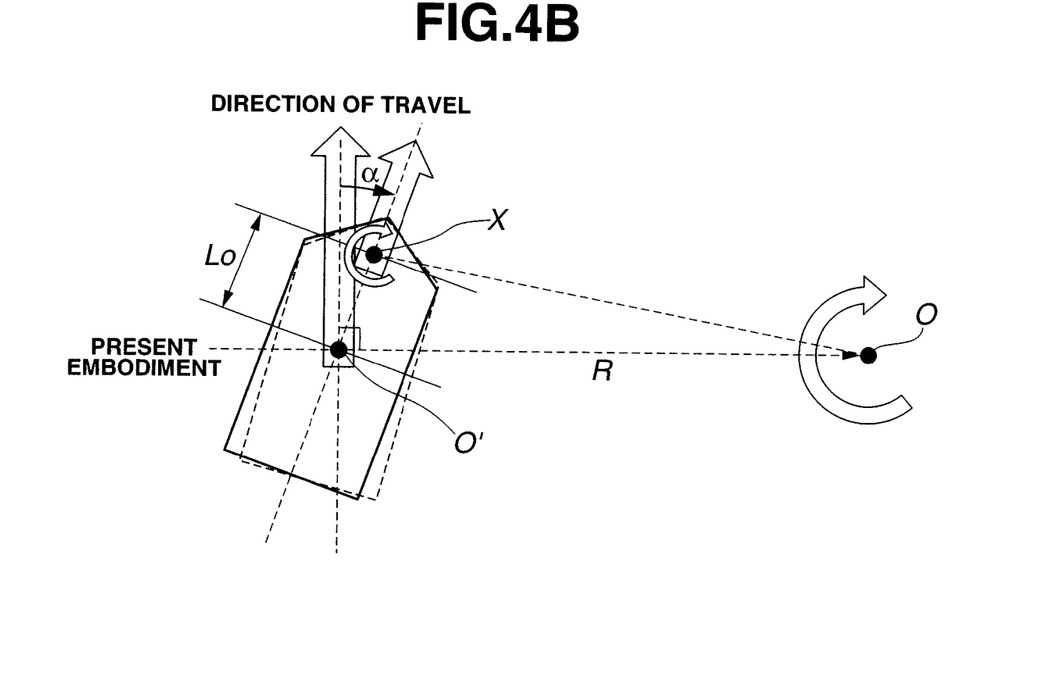

The desired vehicle heading angle α is defined as a desired angle of a longitudinal direction of a vehicle with respect to a vehicle velocity vector at a vehicle reference point O' of the vehicle in a plane in which the vehicle is traveling, as shown in FIGS. 4A and 4B. The vehicle reference point O' is defined as a point where a central longitudinal line crosses a central lateral line in a vehicle. The desired turning radius R is defined as a distance between the vehicle reference point O' and a desired center of turning O. The vehicle reference point O' may be defined differently, for example, as a point located at the center of mass of a vehicle, or as a point located at a driver's seat of a vehicle.

At Step S5, controller 4 sets or computes a desired center of rotation X of automotive vehicle 1 ahead of or behind the vehicle reference point O' along the longitudinal direction of automotive vehicle 1. Specifically, controller 4 computes a distance $L_0$. The distance $L_0$ is defined as a distance from the vehicle reference point O' to the desired center of rotation X. The distance $L_0$ may be set at positive values or negative values. When the distance $L_0$ is equal to a positive value, then it indicates that the desired center of rotation X is located ahead of the vehicle reference point O'. On the other hand, when the distance $L_0$ is equal to a negative value, then it indicates that the desired center of rotation X is located behind the vehicle reference point O'. When it is desired to direct the heading direction of the vehicle inside a curved path, or when allowing the vehicle to rotate for changing the heading angle in a direction of turning of the vehicle, then controller 4 sets the distance $L_0$ at a positive value so that the desired center of rotation X is located ahead of the vehicle reference point O'. On the other hand, when it is desired to direct the heading direction of the vehicle outside a curved path, or when allowing the vehicle to rotate for changing the heading angle in a direction opposite to the direction of turning of the vehicle, then controller 4 sets the distance $L_0$ at a negative value so that the desired center of rotation X is located behind of the vehicle reference point O'.

At Step S6, controller 4 sets or computes a desired vehicle sideslip angle β and a desired vehicle yaw rate γ with respect to the vehicle reference point O', using equations (5) and (6):

$$\beta(s) = -\alpha(s) \quad (5)$$

$$\gamma(s) = V/R(s) + s\{\alpha(s) - L_0/R(s)\} \quad (6)$$

where α(s) represents the Laplace transform of the desired vehicle heading angle α, β(s) represents the Laplace transform of the desired vehicle sideslip angle β, γ(s) represents the Laplace transform of the desired vehicle yaw rate γ, R(s) represents the Laplace transform of the desired turning radius R, and V represents the measured vehicle speed.

Equation (6) serves to allow the vehicle to rotate about the desired center of rotation X for attainment of the desired vehicle heading angle α. Controller 4 specifically sets the desired position of the center of rotation X at a position within a predetermined distance with respect to the vehicle reference point O' along the longitudinal direction of the vehicle. It is to be understood from equation (6) that the desired vehicle yaw rate γ depends on the term of $\{\alpha(s) - L_0/R(s)\}$. When equation (4) is assumed, the term of $\{\alpha(s) - L_0/R(s)\}$ is reduced to $\{\alpha(s)(1 - L_0/R_0)\}$. When the distance $L_0$ is set below the product of α and R, or below $R_0$, then it prevents the sign of $(\alpha - L_0/R)$ from being different from the sign of α, and thereby prevents the vehicle from rotating in the opposite direction, in addition to rotation due to the term of V/R(s) accompanying the turning motion. When the distance L0 is set equal to the product of α and R, then it serves to attain the desired vehicle heading angle α, preventing the vehicle from rotating, in addition to rotation due to the term of V/R(s) accompanying the turning motion. Thus, the attitude and motion of the vehicle during cornering may be arbitrarily determined by suitably adjusting the distance $L_0$.

At Step S7, controller 4 sets or computes desired front and rear road wheel steer angles δf and δr on the basis of the desired vehicle sideslip angle β and the desired vehicle yaw rate γ, using equations (7) and (8):

$$\delta_f(s) = \frac{mL_r V \cdot s + LC_f}{LC_f}\beta(s) + \frac{I_z \cdot s + mL_r V + \frac{L_f LC_f}{V}}{LC_f}\gamma(s) \quad (7)$$

$$\delta_f(s) = \frac{mL_f V \cdot s + LC_r}{LC_r}\beta(s) + \frac{I_z \cdot s + mL_f V + \frac{L_r LC_r}{V}}{LC_r}\gamma(s) \quad (8)$$

where δf(s) represents the Laplace transform of the desired front road wheel steer angle δf, δr(s) represents the Laplace transform of the desired rear road wheel steer angle δr, β(s) represents the Laplace transform of the desired vehicle sideslip angle β, γ(s) represents the Laplace transform of the desired vehicle yaw rate γ, V represents the measured vehicle speed, m represents a vehicle mass, $I_Z$ represents a vehicle yaw moment of inertia, Cf represents a front road wheel cornering power, Cr represents a rear road wheel cornering power, Lf represents the distance between the center of mass and the front axle, Lr represents the distance between the center of mass and the rear axle, and L represents a vehicle wheel base.

Equations (7) and (8) are based on a two-wheeled vehicle model equivalent to automotive vehicle 1. Desired front and rear road wheel steer angles δf and δr are equivalent to a combination of front left and right road wheel steer angles, and a combination of rear left and right road wheel steer angles, respectively. Thus, controller 4 computes desired road wheel steer angles of road wheels 2FL, 2FR, 2RL and 2RR.

At Step S8, controller 4 controls steering mechanisms 3FL, 3FR, 3RL and 3RR in such a manner that the steer angles of road wheels 2FL, 2FR, 2RL and 2RR conform to the desired road wheel steer angles. Specifically, controller 4 receives the measured road wheel steer angles of road wheels 2FL, 2FR, 2RL and 2RR from road wheel steer angle sensor 8, computes a desired output torque of the electric motor of each steering mechanism 3FL, 3FR, 3RL or 3RR on the basis of a deviation between the desired and measured road wheel steer angles of respective road wheel 2FL, 2FR, 2RL or 2RR, and sends control signals, which are indicative of motor drive currents corresponding to the desired output torques, to steering mechanisms 3FL, 3FR, 3RL and 3RR, so as to allow steering mechanisms 3FL, 3FR, 3RL and 3RR to steer the road wheels 2FL, 2FR, 2RL and 2RR to the desired road wheel steer angles. Then, controller 4 returns from this control process to the main program.

As shown in FIG. 3, controller 4 includes modules 41, 42, 43, 44, 45 and 46 for implementing the control process shown in FIG. 2. Module 41 implements Step S3 for setting the desired turning radius R. Module 42 implements Step S4 for setting the desired vehicle heading angle α. Module 43 implements Step S5 for setting the desired center of rotation X. Module 44 implements Step S6 for setting the desired vehicle sideslip angle β, and the desired vehicle yaw rate γ. Module 45 implements Step S7 for setting the desired front and rear road wheel steer angles δf and δr. Module 46 implements Step S8 for controlling the steering mechanisms 3FL, 3FR, 3RL and 3RR so as to steer the road wheels 2FL, 2FR, 2RL and 2RR.

In summary, the control section (4) is configured to: set a desired position of a center of rotation (X) about which the vehicle (1) is to rotate for changing a heading angle (α) of the vehicle (1) with respect to a path of the vehicle (1); set desired front and rear steering outputs (δf, δr) in accordance with the measured steering input (θ) and the desired position of the center of rotation (X); and control the steering mechanism (3FL, 3FR, 3RL, 3RR) in accordance with the desired front and rear steering outputs (δf, δr). The setting the desired front and rear steering outputs (δf, δr) is implemented by: setting a desired turning behavior (β, γ) of the vehicle (1) in accordance with the measured steering input (θ) and the desired position of the center of rotation (X); and setting the desired front and rear steering outputs (δf, δr) in accordance with the desired turning behavior (β, γ). The setting the desired turning behavior (β, γ) is implemented by: setting a desired turning radius (R) of the vehicle (1) in accordance with the measured steering input (θ); setting a desired heading angle (α) of the vehicle (1) with respect to the path in accordance with the desired turning radius (R); and setting the desired turning behavior (β, γ) in accordance with the desired turning radius (R), the desired heading angle (α), and the desired position of the center of rotation (X). In other words, the controller (4) is configured to: set a desired path (R) of the vehicle (1) in accordance with the measured steering input (θ); set a desired sideslip angle (β) of the vehicle (1) in accordance with the measured steering input (θ); set a corrected desired sideslip angle ($\alpha - L_0/R$) of the vehicle (1) in accordance with the desired sideslip angle (β); set a desired yaw rate (γ) of the vehicle (1) in accordance with the desired path (R) and a rate of change of the corrected desired sideslip angle ($\alpha - L_0/R$); and set the desired front and rear steering outputs (δf, δr) in accordance with the desired sideslip angle (β) and the desired yaw rate (γ).

The following describes how the steering apparatus functions according to the foregoing control process. During turning, the vehicle has different vehicle velocity vectors at different points. A vehicle velocity vector at a focused point of the vehicle is perpendicular to the line connected between the focused point and the center of turning O. Accordingly, the vehicle velocity vector at the desired center of rotation X the distance L0 ahead of the vehicle reference point O' is inclined inwardly with respect to the vehicle velocity vector at the vehicle reference point O', as shown in FIG. 4B. For example, in a situation where the vehicle is traveling straight, and then it is requested to attain a desired vehicle heading angle α between the vehicle velocity vector at the vehicle reference point O' and the longitudinal direction of the vehicle, the steering apparatus according to the comparative model needs to rotate the vehicle by the desired vehicle heading angle α, as shown in FIG. 4A. On the other hand, in such a situation, the steering apparatus according to the first embodiment needs to rotate the vehicle by the difference between the desired vehicle heading angle α and the angle of ($L_0/R$), assuming that the vehicle has already attained the angle of ($L_0/R$) as part of the desired vehicle heading angle α, as shown in FIG. 4B. It is to be understood from the foregoing description that when it is desired to direct the vehicle inwardly with respect to the curved vehicle path, the desired vehicle yaw rate γ for the case of rotation about the desired center of rotation X is smaller than that for the case of rotation about the vehicle reference point O'.

On the other hand, the vehicle velocity vector at the desired center of rotation X behind the vehicle reference point O' is inclined outwardly with respect to the vehicle velocity vector at the vehicle reference point O'. It is to be understood from the foregoing description that when it is desired to direct the vehicle outwardly with respect to the curved vehicle path, the desired vehicle yaw rate γ for the case of rotation about the desired center of rotation X is smaller than that for the case of rotation about the vehicle reference point O'.

In summary, the steering apparatus according to the first embodiment is configured to allow the desired center of rotation X to deviate from the vehicle reference point O' in such a manner to reduce the yawing moment required for rotation. This is effective for suppressing rapid changes in the steer angles of the front and rear road wheels, and thereby effective for stabilizing the vehicle dynamic behavior, and preventing the actuators of steering mechanisms 3FL, 3FR, 3RL and 3RR from being subject to excessive loads.

As described above, the distance $L_0$ between the vehicle reference point O' and the desired center of rotation X is set smaller than or equal to an upper limit of (a×R). This is effective for preventing the sign of ($\alpha - L_0/R$) from being different from the sign of α, and thereby preventing the vehicle from rotating in the opposite direction, in addition to rotation due to the term of V/R(s) accompanying the turning motion. When the distance $L_0$ is positive so that the desired center of rotation X is located at a point close to a driver's seat, the driver feels that the yaw rate is relatively low, as compared with the case the vehicle is rotating about the vehicle reference point O' such as the center of mass of the vehicle. On the other hand, when the distance $L_0$ is negative so that the desired center of rotation X is located at a point close to the rear axle, then it prevents the rear part of the vehicle moving away from a desired vehicle path, and thereby allow the driver to feel it easy to drive or steer the vehicle.

The following describes results of a simulation for a comparative example in which the vehicle is controlled to rotate about the vehicle reference point O', and a simulation for the first embodiment in which the vehicle is controlled to rotate about the desired center of rotation X located ahead of the vehicle reference point O'.

Figure 5A:
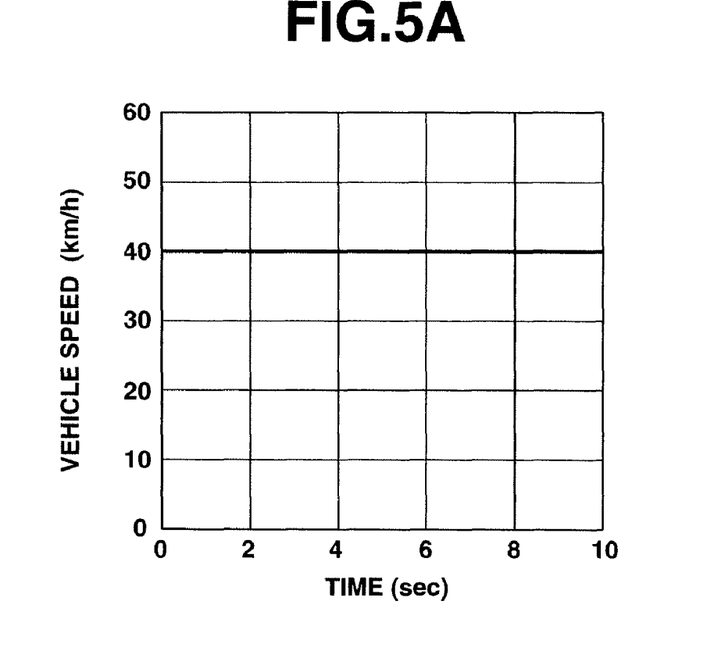
FIGS. 5A and 5B are graphs showing a condition for simulations of how vehicle speed and steering wheel angle change with time in the cases of the automotive vehicle according to the comparative example and the automotive vehicle according to the first embodiment.
Figure 5B:
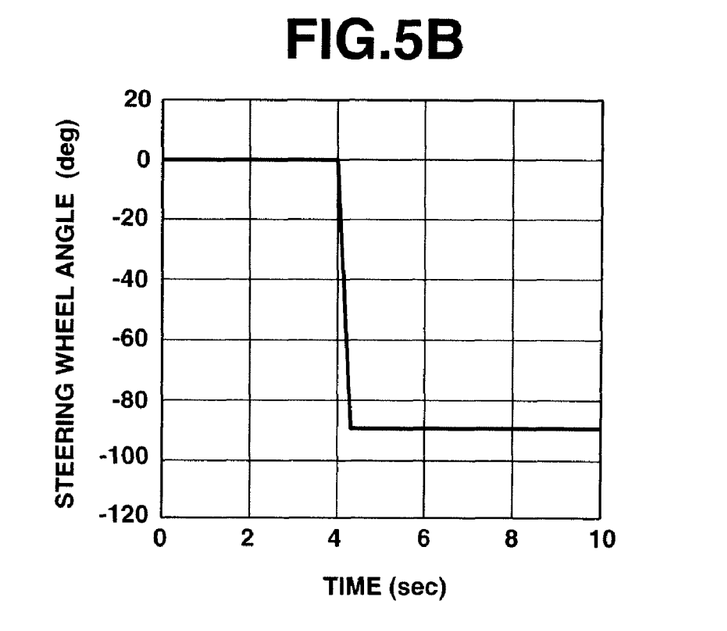
Figure 6A:
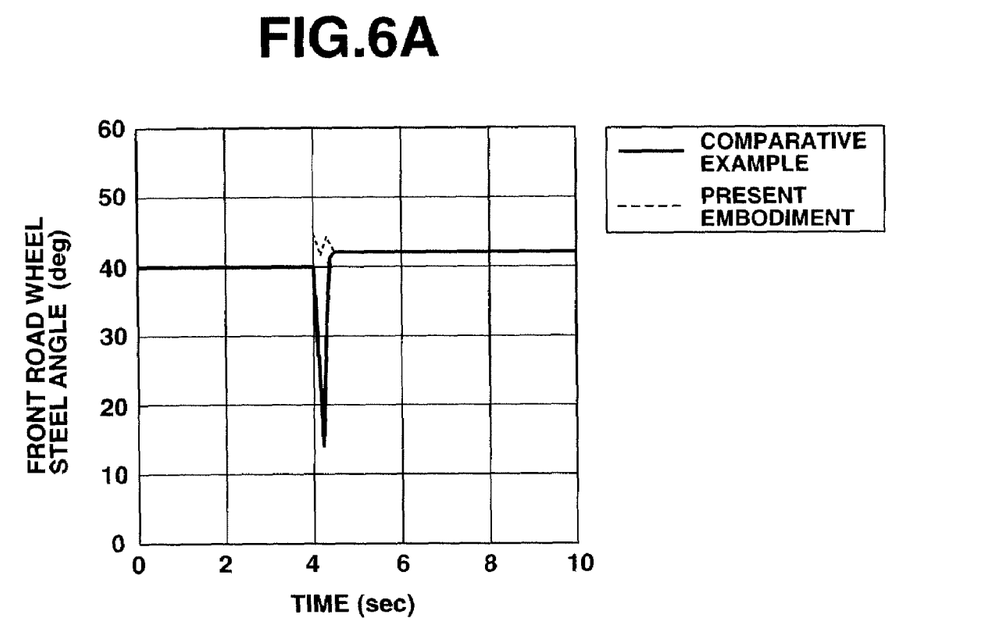
FIGS. 6A and 6B are graphs showing results of the simulations performed under the condition shown in FIGS. 5A and 5B, where front and rear road wheel steer angles change with time in the cases of the automotive vehicle according to the comparative example and the automotive vehicle according to the first embodiment.
Figure 6B:
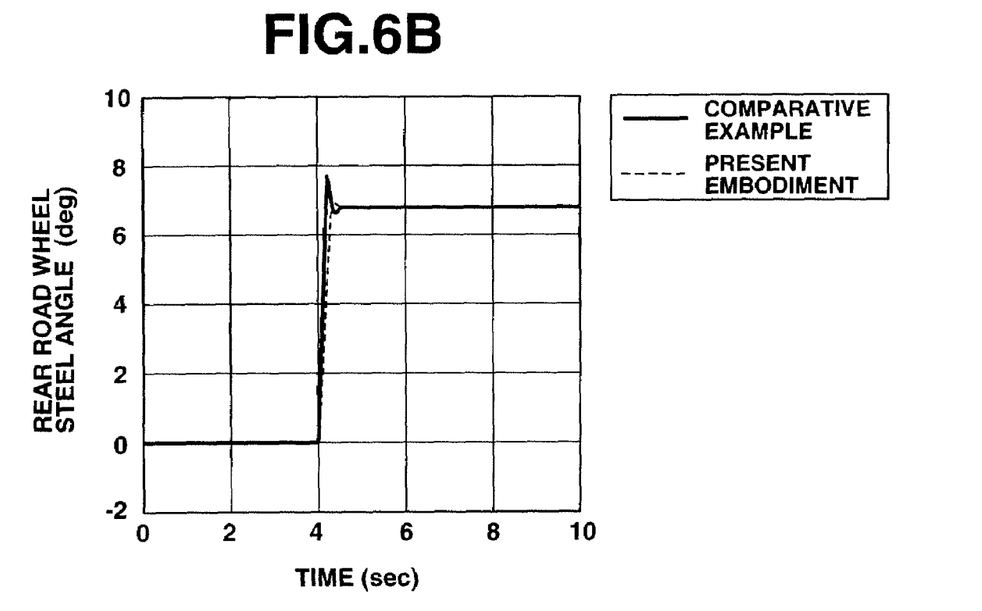
Figure 7A:
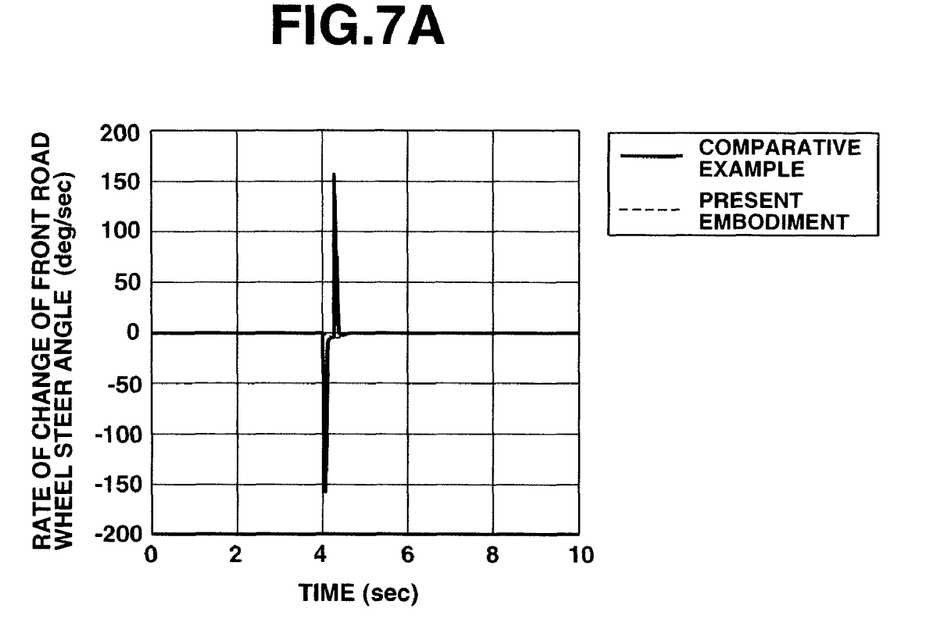
FIGS. 7A and 7B are graphs showing results of the simulations performed under the condition shown in FIGS. 5A and 5B, where rate of change of front and rear road wheel steer angles change with time in the cases of the automotive vehicle according to the comparative example and the automotive vehicle according to the first embodiment.
Figure 7B:
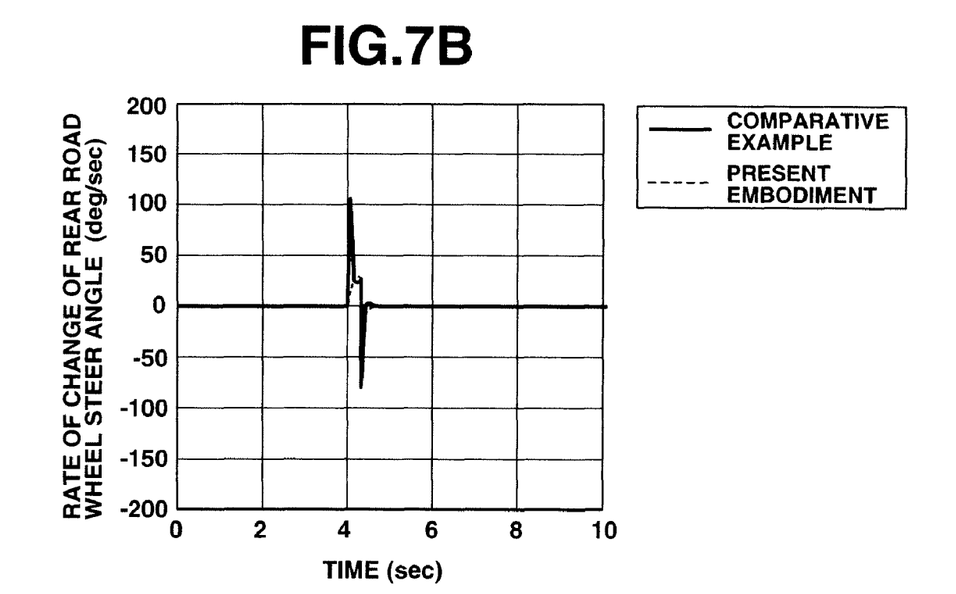
Figure 8A:
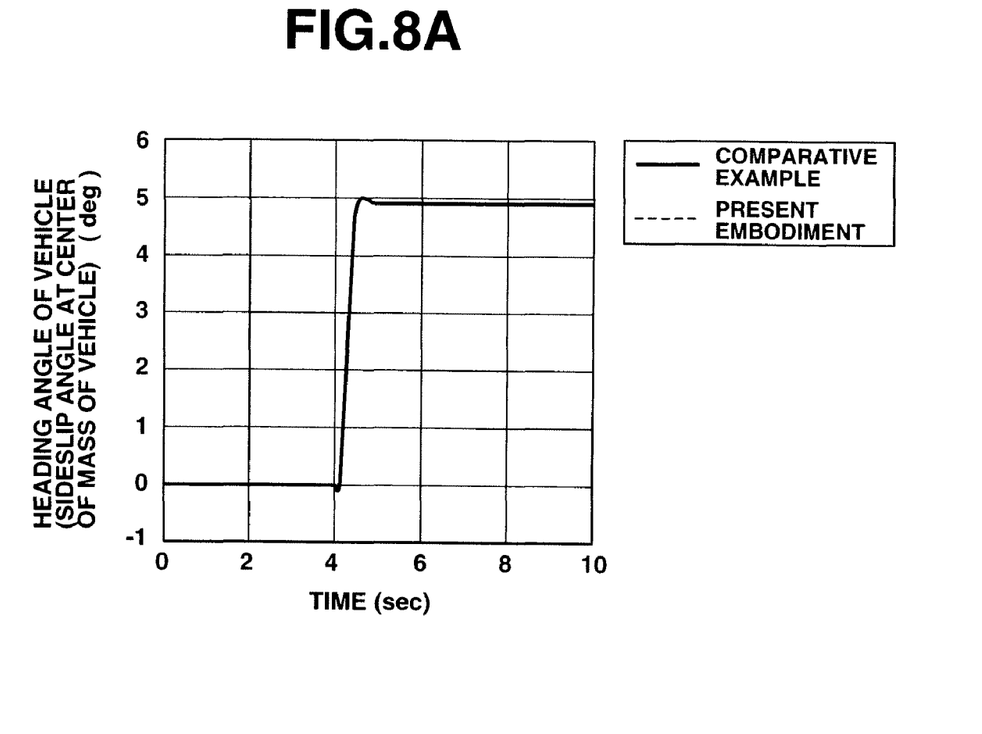
FIGS. 8A and 8B are graphs showing results of the simulations performed under the condition shown in FIGS. 5A and 5B, where vehicle heading angle and vehicle yaw rate change with time in the cases of the automotive vehicle according to the comparative example and the automotive vehicle according to the first embodiment.
Figure 8B:
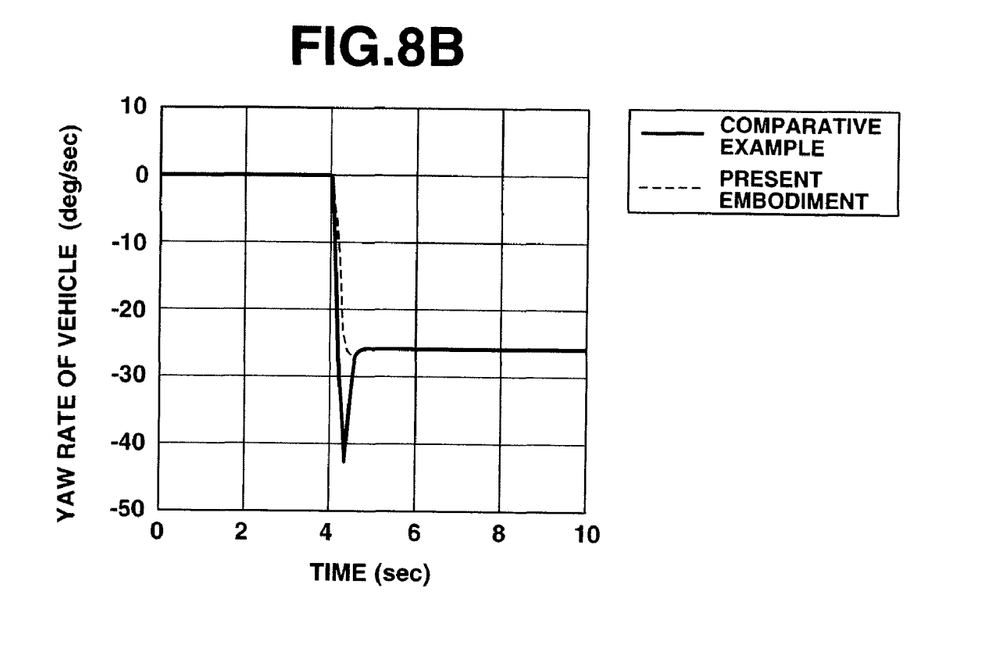

FIGS. 5A and 5B shows a common condition for the simulations in which the vehicle is running at 40 [km/h], and at time 4 [sec], steering wheel 6 starts to be turned at a steering angular speed of 360 [deg/sec] to a steering wheel angle of 90 [deg]. FIGS. 6A, 6B, 7A, 7B, 8A and 8B show results of the simulations, in which solid lines are related to the comparative example, and dotted lines are related to the first embodiment. As shown in FIGS. 6A, 6B, 7A and 7B, according to the comparative example, the steer angles of the front and rear wheels change rapidly immediately after time 4 [sec], so as to implement the rotation about the vehicle reference point O'. On the other hand, as shown in FIGS. 6A, 6B, 7A and 7B, according to the first embodiment, the steer angles of the front and rear wheels show no rapid changes, because the vehicle is controlled to rotate about the desired center of rotation X located ahead of the vehicle reference point O'. As a result, in the case of the first embodiment, the loads applied to steering mechanisms 3FL, 3FR, 3RL and 3RR as actuators are relatively small. The steering speed for the case of the first embodiment is reduced as low as 10% that for the case of the comparative example. As shown in FIGS. 8A and 8B, the steering apparatus according to the first embodiment attains the desired vehicle heading angle α, and reduces transient changes of the desired vehicle yaw rate γ, stabilizing the vehicle dynamic behavior.

It is to be understood from the foregoing simulations that the steering apparatus according to the first embodiment is effective, especially at moments when the desired vehicle heading angle α changes rapidly, for example, at moments when the vehicle starts to turn.

Figure 9:
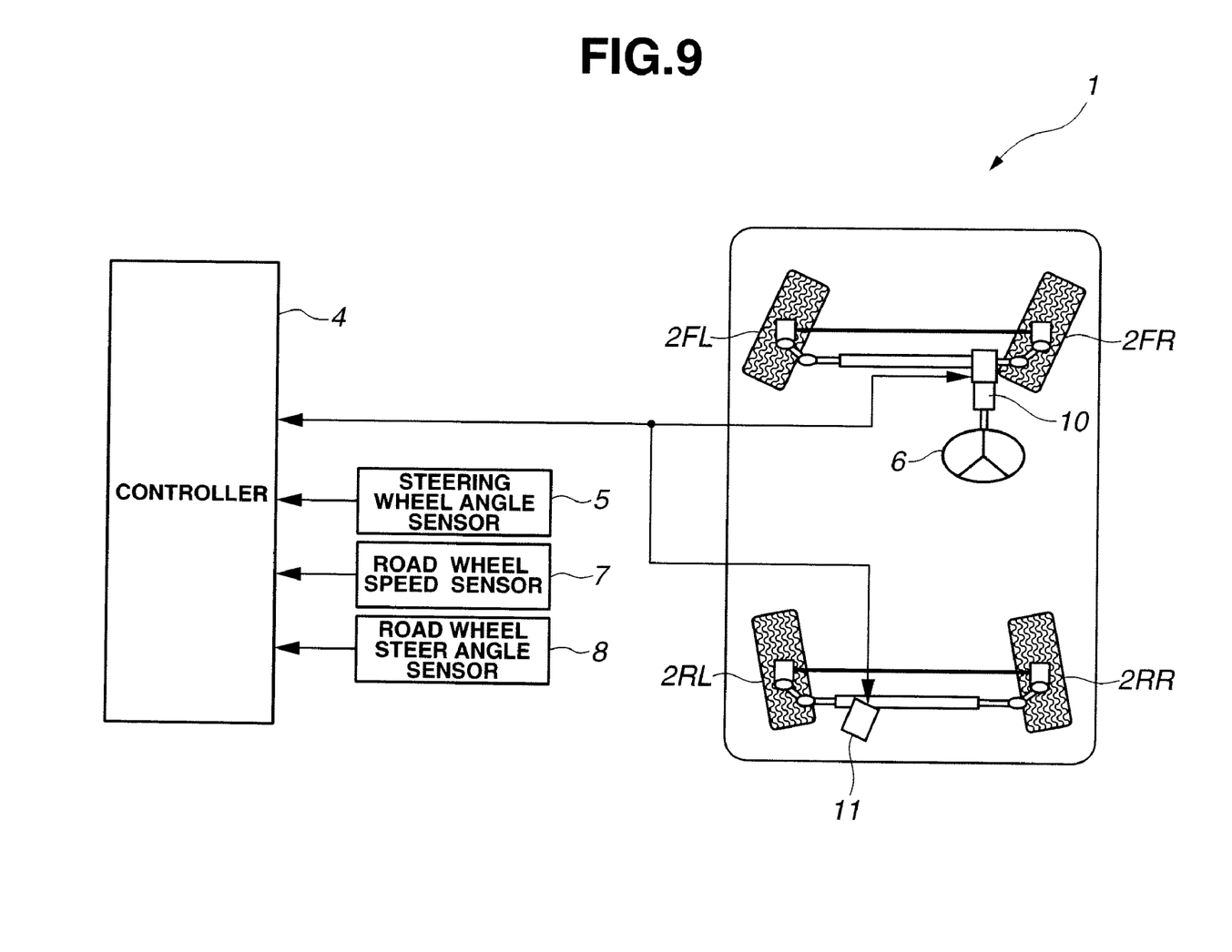
FIG. 9 is a schematic diagram showing system configuration of an automotive vehicle with a steering apparatus according to a second embodiment of the present invention.

FIG. 9 schematically shows an automotive vehicle with a steering apparatus according to a second embodiment of the present invention as a modification of the first embodiment. The steering apparatus according to the second embodiment includes a variable steering ratio mechanism 10 arranged to change the steering ratio of front road wheels 2FL and 2FR, and a steering mechanism 11 for steering the rear road wheels 2RL and 2RR, instead of steering mechanisms 3FL, 3FR, 3RL and 3RR. Thus, the steering apparatus according to the second embodiment is not configured to control all of road wheels 2FL, 2FR, 2RL and 2RR independently of each other, but configured to control the set of front road wheels 2FL and 2FR and the set of rear road wheels 2RL and 2RR independently of each other. The steering apparatus according to the second embodiment is configured to implement the control process as shown in FIG. 2.

Figure 10:
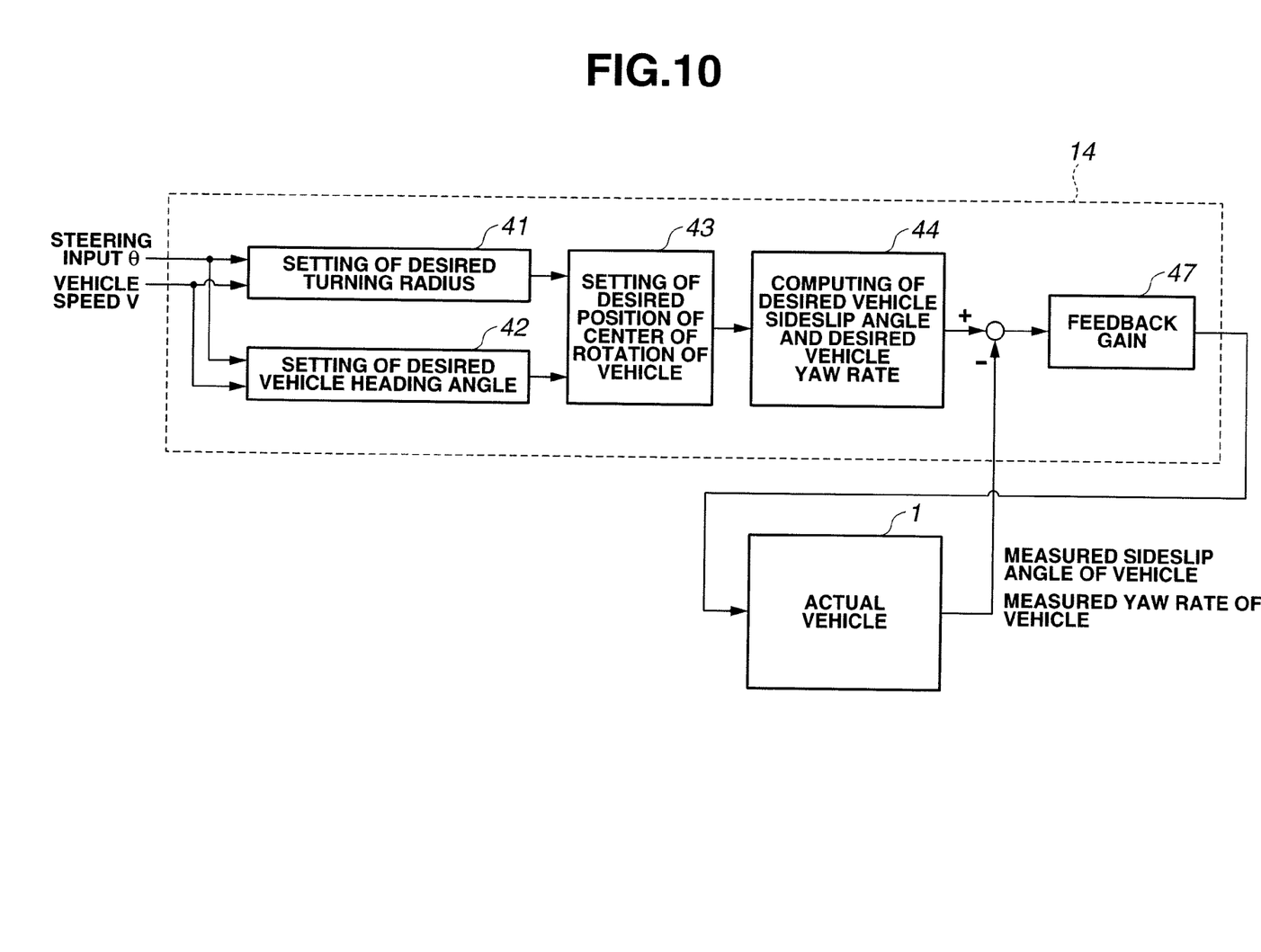
FIG. 10 is a block diagram showing detailed configuration of a controller of a steering apparatus of an automotive vehicle according to a third embodiment of the present invention.

FIG. 10 shows detailed configuration of a controller of a steering apparatus of an automotive vehicle according to a third embodiment of the present invention as a second modification of the first embodiment. A controller 14 as a modification of controller 4 is configured to implement the steering control process by feedback control. Specifically, controller 14 measures an actual vehicle sideslip angle and an actual vehicle yaw rate, computes deviations between the desired values and the actual values, multiplying the deviations by feedback gains provided by a module 47, and compensating the desired vehicle sideslip angle β and desired vehicle yaw rate γ for the deviations.

The following describes advantageous effects produced by the steering apparatus according to the present embodiments. The steering apparatus according to the present embodiments configured to set a desired position of a center of rotation X arbitrarily can set a desired center of rotation X at an arbitrary position in such a manner to reduce the yawing moment applied to the vehicle, and to prevent the steer angles from changing rapidly. This is effective for allowing the vehicle to turn in a stable manner.

Moreover, the steering apparatus according to the present embodiments configured to set the desired turning radius R in accordance with the steering wheel angle and the vehicle speed is effective for allowing the driver to control the turning radius independently of the lateral acceleration, and thereby allowing the driver to control the vehicle behavior easily.

Still Moreover, the steering apparatus according to the present embodiments configured to: set the desired position of the center of rotation at a first position, when allowing the vehicle to rotate for changing the heading angle in a direction of turning of the vehicle; and set the desired position of the center of rotation at a second position, when allowing the vehicle to rotate for changing the heading angle in a direction opposite to the direction of turning of the vehicle, wherein the first position is ahead of the second position along a longitudinal direction of the vehicle, is effective for setting a desired center of rotation X at an arbitrary position in such a manner to reduce the yaw moment applied to the vehicle, and to prevent the steer angles from changing rapidly. This is effective for allowing the vehicle to turn in a stable manner, and preventing the steering actuators from being subject to excessive loads.

Moreover, the steering apparatus according to the present embodiments configured to set the desired position of the center of rotation at a position within a predetermined distance with respect to the predetermined reference point along the longitudinal direction of the vehicle, is effective for preventing the sign of a corrected desired vehicle heading angle from being different from the sign of the desired vehicle heading angle, and thereby preventing the vehicle from rotating in the opposite direction, in addition to rotation accompanying the turning motion.

This application is based on a prior Japanese Patent Application No. 2007-100384 filed on Apr. 6, 2007. The entire contents of this Japanese Patent Application No. 2007-100384 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A steering apparatus for a vehicle including a steering input device, front and rear steering output devices, and a steering mechanism for steering the front and rear steering output devices, the steering apparatus comprising:
    a measurement section arranged to measure a steering input of the steering input device; and
    a control section configured to:
        set a desired turning radius of the vehicle in accordance with the measured steering input;
        set a desired heading angle of the vehicle with respect to a path of the vehicle in accordance with the desired turning radius;
        set a desired position of a center of rotation about which the vehicle is to rotate for changing the heading angle of the vehicle with respect to the path of the vehicle;
        set the desired turning behavior in accordance with the desired turning radius, the desired heading angle, and the desired position of the center of rotation;
        set desired front and rear steering outputs in accordance with the measured steering input and the desired position of the center of rotation; and
        control the steering mechanism in accordance with the desired front and rear steering outputs.

2. The steering apparatus as claimed in claim 1, wherein:
    the steering input device includes a steering wheel;
    the steering input includes a steering wheel angle of the steering wheel;
    the front and rear steering output devices include front and rear steerable road wheels;
    the desired front and rear steering outputs include desired front and rear road wheel steer angles; and
    the control section is further configured to:
        set the desired turning behavior of the vehicle in accordance with the measured steering input and the desired position of the center of rotation; and
        set the desired front and rear steering outputs in accordance with the desired turning behavior.

3. The steering apparatus as claimed in claim 2, wherein the control section is further configured to set the desired turning radius in accordance with the measured steering input and a speed of the vehicle.

4. The steering apparatus as claimed in claim 1, wherein:
the control section is further configured to:
set the desired position of the center of rotation at a first position, when allowing the vehicle to rotate for changing the heading angle in a direction of turning of the vehicle; and
set the desired position of the center of rotation at a second position, when allowing the vehicle to rotate for changing the heading angle in a direction opposite to the direction of turning of the vehicle; and
the first position is ahead of the second position along a longitudinal direction of the vehicle.

5. The steering apparatus as claimed in claim 1, wherein the control section is further configured to:
set the desired position of the center of rotation at a position ahead of a predetermined reference point along a longitudinal direction of the vehicle, when allowing the vehicle to rotate for changing the heading angle in a direction of turning of the vehicle; and
set the desired position of the center of rotation at a position behind the predetermined reference point along the longitudinal direction of the vehicle, when allowing the vehicle to rotate for changing the heading angle in a direction opposite to the direction of turning of the vehicle.

6. The steering apparatus as claimed in claim 5, wherein the predetermined reference point is located at a center of mass of the vehicle.

7. The steering apparatus as claimed in claim 5, wherein the predetermined reference point is located at a driver's seat of the vehicle.

8. The steering apparatus as claimed in claim 5, wherein the control section is further configured to set the desired position of the center of rotation at a position within a predetermined distance with respect to the predetermined reference point along the longitudinal direction of the vehicle.

9. A steering apparatus for a vehicle including a steering input device, front and rear steering output devices, and a steering mechanism for steering the front and rear steering output devices, the steering apparatus comprising:
means for measuring a steering input of the steering input device;
means for setting a desired turning radius of the vehicle in accordance with the measured steering input;
means for setting a desired heading angle of the vehicle with respect to a path of the vehicle in accordance with the desired turning radius;
means for setting a desired position of a center of rotation about which the vehicle is to rotate for changing the heading angle of the vehicle with respect to the path of the vehicle;
means for setting the desired turning behavior in accordance with the desired turning radius, the desired heading angle, and the desired position of the center of rotation;
means for setting desired front and rear steering outputs in accordance with the measured steering input and the desired position of the center of rotation; and
means for controlling the steering mechanism in accordance with the desired front and rear steering outputs.

10. An automotive vehicle comprising:
a steering input device;
front and rear steering output devices;
a steering mechanism for steering the front and rear steering output devices;
a measurement section arranged to measure a steering input of the steering input device; and
a control section configured to:
set a desired turning radius of the vehicle in accordance with the measured steering input;
set a desired heading angle of the vehicle with respect to a path of the vehicle in accordance with the desired turning radius;
set a desired position of a center of rotation about which the vehicle is to rotate for changing the heading angle of the vehicle with respect to the path of the vehicle;
set the desired turning behavior in accordance with the desired turning radius, the desired heading angle, and the desired position of the center of rotation;
set desired front and rear steering outputs in accordance with the measured steering input and the desired position of the center of rotation; and
control the steering mechanism in accordance with the desired front and rear steering outputs.

11. A steering control method for a vehicle including a steering input device, front and rear steering output devices, and a steering mechanism for steering the front and rear steering output devices, the steering control method comprising:
measuring a steering input of the steering input device;
setting a desired turning radius of the vehicle in accordance with the measured steering input;
setting a desired heading angle of the vehicle with respect to a path of the vehicle in accordance with the desired turning radius;
setting a desired position of a center of rotation about which the vehicle is to rotate for changing the heading angle of the vehicle with respect to the path of the vehicle;
setting the desired turning behavior in accordance with the desired turning radius, the desired heading angle, and the desired position of the center of rotation;
setting desired front and rear steering outputs in accordance with the measured steering input and the desired position of the center of rotation; and
controlling the steering mechanism in accordance with the desired front and rear steering outputs.

12. The steering control method as claimed in claim 11, wherein the setting the desired front and rear steering outputs is implemented by:
setting the desired turning behavior of the vehicle in accordance with the measured steering input and the desired position of the center of rotation; and
setting the desired front and rear steering outputs in accordance with the desired turning behavior.

* * * * *